INVENTORS W. S. BOYLE
H. W. VERLEUR
BY
ATTORNEY

United States Patent Office 3,473,602
Patented Oct. 21, 1969

3,473,602
APPARATUS AND METHOD FOR ACHIEVING TEMPERATURE STABILIZATION OF A RADIATOR USING THERMOREFLECTANCE MATERIALS
Willard S. Boyle, Summit, and Hans W. Verleur, Plainfield, N.J., assignors to Bell Telephone Laboratories, Incorporated, Murray Hill and Berkeley Heights, N.J., a corporation of New York
Filed Sept. 18, 1967, Ser. No. 668,535
Int. Cl. F28f *13/18, 19/02*
U.S. Cl. 165—1  5 Claims

ABSTRACT OF THE DISCLOSURE

When a radiating body (e.g., a satellite) is coated with a layer of a metallic reflector, a dielectric and a thermoreflectance material in the order recited, the temperature of the body is stabilized at the transition temperature of the thermoreflectance material.

BACKGROUND OF THE INVENTION

This invention relates to the temperature stabilization of a body radiating and absorbing thermal energy.

In many situations it is desirable that the temperature of a body (e.g., a satellite) remain fixed, at least for a particular range of values of thermal power absorbed or generated by the body. The exterior of a satellite, for example, may be subjected to variable thermal input from the sun, and yet it is desirable that the temperature of electronic equipment located within the satellite remain relatively constant. Varying temperatures within the satellite would change the operating characteristics of the electronic equipment due to the temperature-dependent parameters (e.g., resistivity, breakdown voltage) of semiconductor components frequently used. It is also desirable for obvious reasons to fix the temperature of a satellite without adding excessive weight to the space craft.

The prior art has resorted to several techniques to reduce the temperature variations within a satellite, including insulating the satellite skin and pumping coolant through the satellite interior. However, both of these techniques are bulky and of course add undesirable weight to the space craft. In addition, attempts have been made to reduce temperature variations by painting satellites with several colors of paint in order to balance the amounts of thermal power radiated and absorbed. Although the latter technique may reduce temperature variations, it has been only moderately successful in stabilizing the temperature within a satellite. Experiments utilizing various types of skin surfaces have been equally unsuccessful. The skin surface of the Explorer IV satellite, for example, is sandblasted stainless steel with 25% of the surface area covered with lengthwise strips of aluminum oxide. Yet, the interior temperature is maintained only within the range 0° C. to 65° C. (See, Proceedings of the Fifth Sagamore Ordnance Materials Research Conference, Sept. 16, 1958, page. 95.)

SUMMARY OF THE INVENTION

The present invention stabilizes the temperature of a radiating body for a particular range of values of thermal power radiated. The technique of the invention includes the deposition of a variable reflectance thin film and a dielectric layer over the exterior surface of the body. The thin films are extremely light weight, making the invention particularly suitable for satellite applications and the like.

The phenomenon of variable reflectance may be described in terms of two separate and distinct physical effects: electroreflectance and thermoreflectance. The present invention employs only the phenomenon of thermoreflectance, however. In thermoreflectance materials it has been found that the reflectance of light from the material is highly sensitive to the temperature of the material. Such materials, as used in the present invention, are characterized by a metal-semiconductor phase transition. That is, there is some transition temperature below which the material is a semiconductor and above which it is metallic. As the temperature of the material is increased from below the transition temperature, the reflectance increases gradually, but at transition temperature the reflectance of the material increases abruptly and consequently its thermal emissivity decreases abruptly. Thermoreflectance materials include vanadium dioxide, vanadium monoxide, vanadium sesquioxide and titanium trioxide.

In accordance with an illustrative embodiment of the invention these characteristics are inverted in a sandwich-like structure by coating the body whose temperature is to be stabilized with a metallic reflector, a dielectric and a thin thermoreflector in that order. The result is that as the temperature of the sandwich-like structure increases from below the transition temperature of the thermoreflector, the reflectance of the structure decreases gradually. At the transition temperature the reflectance of the structure undergoes an abrupt decrease, whereas the emissivity undergoes an abrupt increase. (It is to be noted that only the properties of the sandwich structure, and not the thermoreflector, are inverted.) Because power radiated is directly proportional to emissivity (the Stefan-Boltzmann law), it too increases abruptly with a nearly-vertical slope at the transition temperature. The vertical slope extends for a particular range of values of power radiated which is dependent on a number of factors, including the particular thermoreflectance material used. Thus, by maintaining the power radiated within the aforementioned range, the surface of the body is fixed at the transition temperature of the thermoreflectance material. The interior temperature of the body, after thermal equilibrium has been reached, is also fixed at the same temperature.

BRIEF DESCRIPTION OF THE DRAWINGS

The above and other features of the invention, together with its various advantages, will be easily understood from the following more detailed description taken in conjunction with the accompanying drawings, in which.

DETAILED DESCRIPTION

Figure 1:
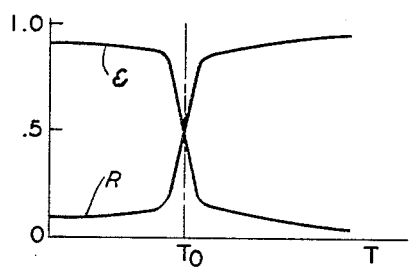
FIG. 1 is a graph of emissivity and reflectivity versus temperature for bulk thermoreflectance materials.
Figure 2:
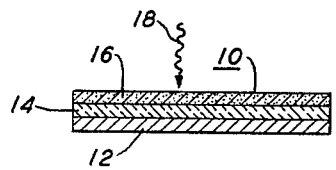
FIG. 2 is a partial cross-sectional view of a stabilized radiator in accordance with one embodiment of the invention.
Figure 3:
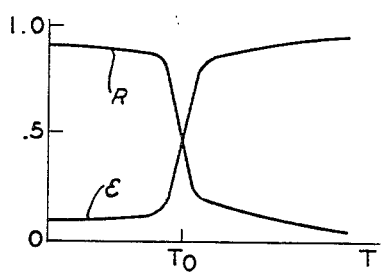
FIG. 3 is a graph of emissivity and reflectivity versus temperature for a stabilized radiator in accordance with the invention.

Turning now to FIG. 1, there is shown a graph of average reflectivity R and emissivity ϵ versus temperature at a particular wavelength for a bulk thermoreflectance material. Below the transition temperature $T_o$ the average reflectivity (as well as the absorptivity) is low and the emissivity high, whereas above the transition temperature the average reflectivity (as well as the absorptivity) is high and the emissivity is low. As shown in FIG. 2, these properties are inverted in a self-stabilized radiator 10 formed from a metallic reflector 12 upon which have been deposited a dielectric layer 14 and a thermoreflectance layer 16 in the order recited. It is to be noted again that the properties of the sandwich-like radiator 10, and not the thermoreflectance layer 16, are inverted. The inversion of the reflectance characteristic in the radiator 10 is explained as follows. Below $T_o$ the absorptivity of the thermoreflectance layer 16 is low. Consequently, radiant energy 18 is transmitted through the layer 16 and the dielectric 14, reflected from the metallic reflector 12, and retransmitted through the dielectric 14 and the thermoreflectance layer 16. Very little of the energy is absorbed and so the radiator 10 exhibits high reflectivity below $T_o$ as compared to the low reflectivity of a bulk thermoreflector below $T_o$. After the absorption of heat, the temperature of the thermoreflectance layer 16 increases above $T_o$ and its absorptivity increases. The radiant energy 18 is therefore highly absorbed by the thermoreflectance layer 16. That portion of the energy which is transmitted through layer 16 is reflected from reflector 12 and again absorbed by the thermoreflectance layer 16. Consequently, the radiator 10 exhibits a low reflectivity above $T_o$, whereas a bulk thermoreflector exhibits a high reflectivity above $T_o$; that is, the reflectance properties of the radiator 10 are inverted with respect to those of a bulk thermoreflector. A typical radiator 10 exhibits at a proper wavelength (e.g., $3\mu$ or $9\mu$ for $VO_2$) reflectivity and emissivity curves as shown in FIG. 3. The average reflectivity is high below $T_o$ and decreases abruptly at $T_o$, whereas the average emissivity is low below $T_o$ and increases abruptly at $T_o$.

Figure 4:
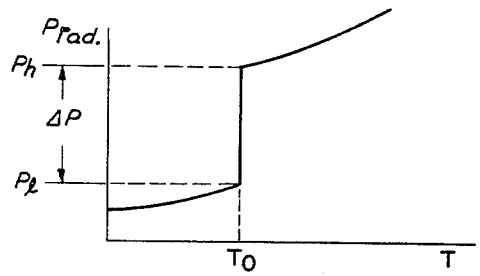
FIG. 4 is a graph of power radiated versus temperature for a stabilized radiator in accordance with the invention.

The abrupt increase in emissivity at $T_o$ produces a nearly-vertical slope at $T_o$ in the power radiated versus temperature characteristic of the radiator 10 as shown in FIG. 4, the amount of increase being dependent on the dimensions of the various layers of the structure. Above and below $T_o$ the power radiated follows the well-known Stefan-Boltzmann law $P_{rad}=\epsilon\sigma T^4$, where $\sigma$ is the Stefan-Boltzmann constant. At $T_o$, however, the power radiated also increases abruptly because it is linearly proportional to the emissivity. Consequently, for values of power radiated in the range $\Delta P$ the temperature of the radiator 10 is fixed at $T_o$, the transition temperature of the thermoreflectance material.

It is desirable to maximize the range $\Delta P$ in order that the temperature of the radiator 10 remain fixed over a broad range of power. This maximization is accomplished by choosing for the thermoreflectance and dielectric layers appropriate thicknesses which may be different for different materials. Consider the black body radiation curve labeled $P_b(\lambda)$ shown in FIG. 5. It represents the power radiated by a black body at a fixed temperature versus wavelength. The fixed temperature in this case is the transition temperature $T_o$. The wavelength at which the peak of $P_b(\lambda)$ occurs is given by approximately $\lambda_p=0.28/T_o$. The curve labeled $\epsilon(\lambda)$ is the emissivity of the radiator 10 as a function of wavelength. The oscillatory nature of $\epsilon(\lambda)$ results from constructive and destructive interference produced by the multi-layer structure of the radiator 10. Interference occurs whenever $m\lambda/2n=2t$ where $m$ is an integer, $n$ is the index of refraction of the dielectric and $t$ is the thickness of the dielectric. Constructive interference occurs whenever $m$ is an odd integer, for example at the first interference fringe at wavelength $\lambda_1=4tn$.

In order to maximize $\Delta P$ it is desirable to maximize $P_h$ and minimize $P_l$ (FIG. 4). To maximize $P_h$ it is desirable to maximize the common area under the curves $P_b(\lambda)$ and $\epsilon(\lambda)$ for $T>T_o$; that is maximize $$\int_o^{\lambda_o} P_b(\lambda)\epsilon(\lambda)d\lambda$$

A good approximation to this maximization occurs if the wavelength $\lambda_1$ of the first interference fringe of $\epsilon(\lambda)$ is made to be as nearly equal as possible to the wavelength $\lambda_p$ at which peak black body radiation occurs; that is $\lambda_1=\lambda_p=4tn$ or the thickness of the dielectric is made to be $\lambda_p/4n$.

Take for example a thermoreflectance layer such as vanadium dioxide having a transition temperature $T_o=68°$ C. which means that the peak of the black body radiation curve occurs at about $\lambda_p=8\mu$. To maximize $\Delta P$, the thickness $t$ of the dielectric would be $\lambda_p/4n=2/n$ microns, or $t=1.36\mu$ for a barium fluoride dielectric having an index of refraction $n=1.47$. Typical dimensions of the radiator 10 are 100 A° for a vanadium dioxide layer 16 and $1.5\mu$ for a barium fluoride layer 14. The thickness of the metallic reflector 12, which is typically made of gold or aluminum is not critical. The range $\Delta P$ for these materials and dimensions extends from about $0.35\times10^{-2}$ watts/cm.² to $3.7\times10^{-2}$ watts/cm.². Thus, for a spherical body 100 cm. in diameter, the range $\Delta P$ is from about 100 watts to 1160 watts, a broad range of power over which the temperature of a radiator 10 employing vanadium dioxide would be stabilized at about $T_o=68°$ C.

Figure 5:
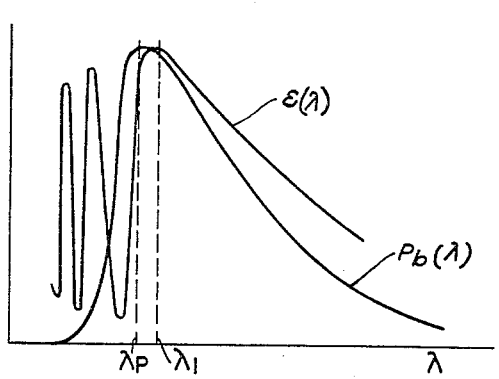
FIG. 5 is a graph of power radiated by a black body and emissivity of one embodiment of the invention versus wavelength.
Figure 6:
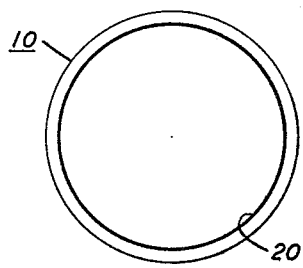
FIG. 6 shows schematically the cross section of a satellite whose temperature is stabilized in accordance with one embodiment of the invention.

The stabilized radiator 10 can be utilized to stabilize the temperature of any body, typically a satellite as shown schematically in FIG. 5. The outer surface 20 of a satellite is covered with a radiator 10, as previously described, which absorbs radiation from its interior and from the sun and emits radiation into space. For values of power radiated by the radiator 10 within the range $\Delta P$ the temperature of the outer surface 20 of the satellite is fixed $T_o$. After thermal equilibrium is reached, the temperature of the entire interior of the satellite will also be fixed at $T_o$, a very desirable characteristic from the standpoint of electrical stability of electronic equipment located in the satellite. Of course, if the outer surface of the body or satellite is itself a metallic reflector, then the layer 12 of the radiator 10 may be omitted. In the latter case, the dielectric layer 14 would be deposited directly on the outer surface of the body, and the thermoreflectance layer 16 then deposited on the dielectric.

Other typical thermoreflectance materials which are suitable for use in accordance with the principles of the invention include vanadium monoxide, vanadium sesquioxide and titanium trioxide which have respective transition temperatures of $-148°$ C., $-95°$ C. and $327°$ C.

What is claimed is:

1. A temperature stabilized radiator comprising a thermoreflectance material having a power-radiated versus temperature characteristic which decreases abruptly at the transistion temperature of said material, said material being characterized by a metal-semiconductor phase transition at said transition temperature, and means for causing the power-radiated characterized of said material to increase abruptly at the transition temperature comprising a dielectric layer formed on one surface of said material and a reflector formed on said dielectric layer.

2. The radiator of claim 1 wherein the thickness of said dielectric layer is approximately one quarter of the wavelength, as measured in the dielectric, at which peak black body radiation occurs for a temperature equal to the transition temperature of said thermoreflectance material.

3. The radiator of claim 1 wherein the emissivity versus wavelength characteristic of said radiator is characterized by an interference pattern, and wherein the first interference fringe of the pattern is made to occur at a wavelength substantially equal to the wavelength at which peak black body radiation occurs for a temperature equal to the transition temperature of said thermoreflectance material.

4. The method of stabilizing the temperature of a body comprising the steps of coating said body with a reflector, coating said reflector with a dielectric, and coating said dielectric with a thermoreflectance material, said material being characterized by a metal-semiconductor phase transition.

5. The method of stabilizing the temperature of a reflective body comprising the steps of coating body with a dielectric, and coating said dielectric with a thermoreflectance material, said material being characterized by a metal-semiconductor phase transition.

References Cited
UNITED STATES PATENTS

| | | | |
|---|---|---|---|
| 3,384,324 | 5/1968 | O'Sullivan | 165—133 |
| 3,391,728 | 7/1968 | Kelly | 165—32 |

ROBERT A. O'LEARY, Primary Examiner

C. SUKALO, Assistant Examiner

U.S. Cl. X.R.

165—133